(12) United States Patent
Hauck

(10) Patent No.: US 8,479,906 B2
(45) Date of Patent: Jul. 9, 2013

(54) CLUTCH DEVICE WITH FASTENING MEANS FOR FIXING THE OUTPUT HUB

(75) Inventor: Hans Juergen Hauck, Schwaebisch Hall (DE)

(73) Assignee: BorgWarner Inc., Auburn Hills, MI (US)

( * ) Notice: Subject to any disclaimer, the term of this patent is extended or adjusted under 35 U.S.C. 154(b) by 851 days.

(21) Appl. No.: 12/524,083

(22) PCT Filed: Jan. 31, 2008

(86) PCT No.: PCT/EP2008/000736
§ 371 (c)(1),
(2), (4) Date: Jul. 22, 2009

(87) PCT Pub. No.: WO2008/095637
PCT Pub. Date: Aug. 14, 2008

(65) Prior Publication Data
US 2010/0084240 A1 Apr. 8, 2010

(30) Foreign Application Priority Data

Feb. 8, 2007 (DE) .......................... 10 2007 007 011
May 26, 2007 (DE) .......................... 10 2007 024 788

(51) Int. Cl.
*F16D 13/58* (2006.01)
*F16D 25/10* (2006.01)
*F16D 25/12* (2006.01)
*F16D 1/06* (2006.01)

(52) U.S. Cl.
USPC ............... 192/70.16; 192/48.619; 192/110 S; 192/115

(58) Field of Classification Search
USPC ................. 192/70.16, 48.611, 48.618, 110 S, 192/115, 48.619
See application file for complete search history.

(56) References Cited

U.S. PATENT DOCUMENTS

| 808,975 | A | * | 1/1906 | Dittbenner | ................. | 192/70.16 |
| 808,976 | A | * | 1/1906 | Dittbenner | ..................... | 139/412 |
| 7,249,665 | B2 | * | 7/2007 | Heinrich et al. | ........... | 192/48.61 |
| 7,686,147 | B2 | * | 3/2010 | Friedmann et al. | .......... | 192/48.8 |

FOREIGN PATENT DOCUMENTS

| DE | 10 2005 045158 A1 | 3/2007 |
| DE | 102005045158 | * 3/2007 |
| EP | 1 226 992 A | 7/2002 |
| EP | 1 528 276 A | 5/2005 |
| EP | 1 632 687 A | 8/2006 |

\* cited by examiner

*Primary Examiner* — David D Le
*Assistant Examiner* — Jacob S Scott
(74) *Attorney, Agent, or Firm* — Bliss McGlynn, P.C.

(57) ABSTRACT

A clutch device comprises an engine-side input hub (6) including a driver disk (10) and a cutout (70), a transmission-side output hub (46) adapted to be indirectly coupled to the engine-side input hub (6), a fastener (68) for axially fixing the transmission-side output hub (46) to a transmission shaft (60) and adapted to be accessed for actuation through the cutout (70) after the engine-side input hub is indirectly coupled to the transmission-side output hub, and a cup-shaped stopper (72) for opening and closing the cutout (70) and, in an installed state, has a guide section (108) that projects in an axial direction out of the cutout (70) and can be supported in an end-side depression (110) of an engine output shaft (5).

21 Claims, 4 Drawing Sheets

CLUTCH DEVICE WITH FASTENING MEANS FOR FIXING THE OUTPUT HUB

CROSS-REFERENCE TO RELATED APPLICATIONS

Figure 1:
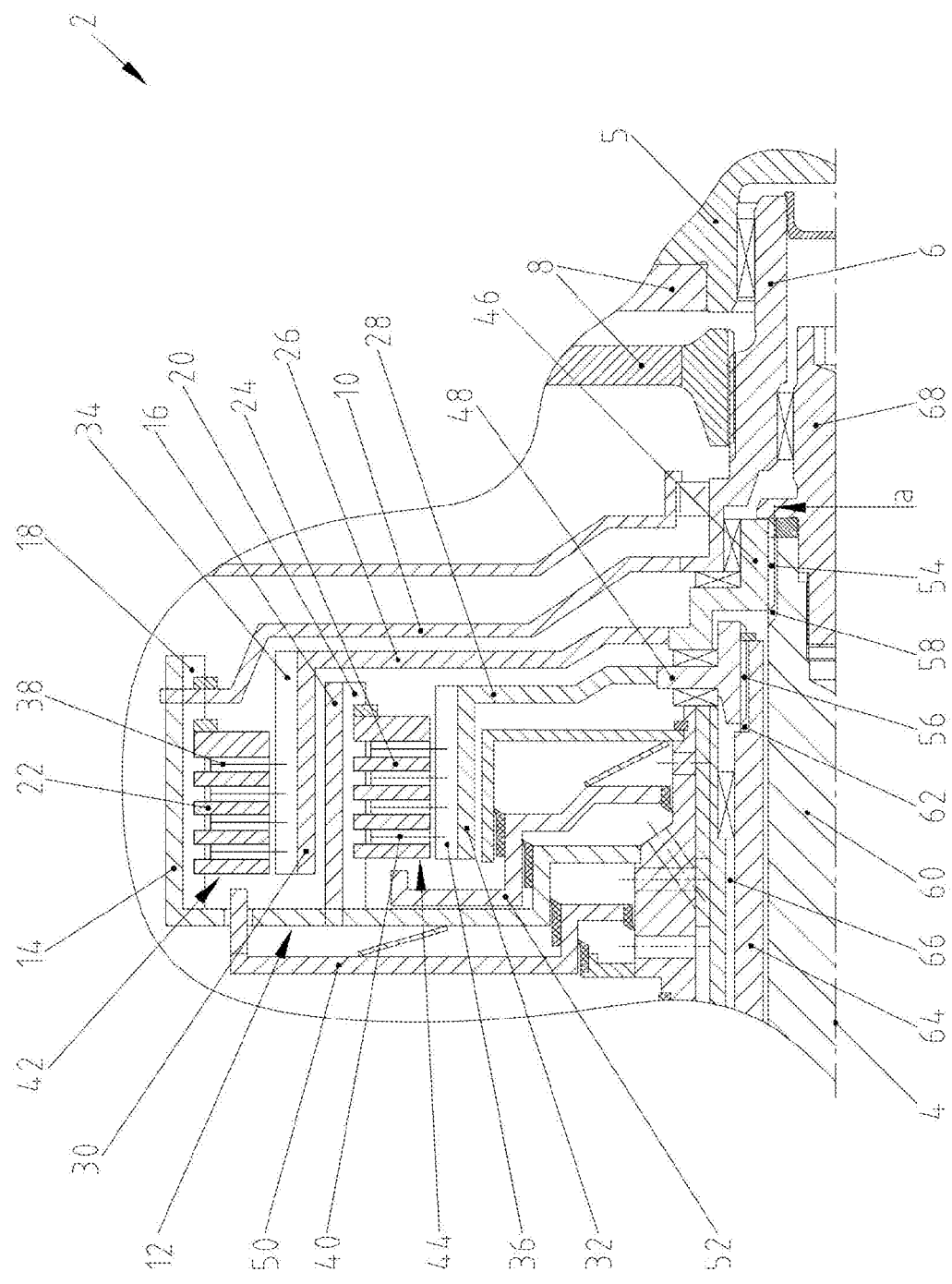

This application claims benefit of PCT Patent Application PCT/EP2008/000736 entitled "CLUTCH DEVICE WITH FASTENING MEANS FOR FIXING THE OUTPUT HUB" and filed on Jan. 31, 2008, which claims benefit of German Patent Application 10 2007 007 011.1 filed on Feb. 8, 2007 and German Patent Application 10 2007 024 788.7 filed on May 26, 2007.

BACKGROUND OF INVENTION

1. Field of Invention

The present invention relates to a clutch device having an engine-side input hub, which has a driver disk, and having a transmission-side output hub, with it being possible for the engine-side input hub to be coupled to the transmission-side output hub, and with a fastening means being provided for axially fixing the output hub to a transmission shaft.

2. Description of Related Art

The prior art discloses clutch devices, in particular multi-plate clutches, which have an input hub which can be connected to the engine output shaft. The input hubs are in turn provided with a driver disk in order to transmit the rotation to the clutch input housing or the like. The input hub is for example connected to an outer plate carrier whose outer plates can be coupled to inner plates, with the inner plates in turn being arranged on an inner plate carrier. The inner plate carrier in turn has an output hub which can be connected to a transmission shaft. Here, the output hub is fixed to the transmission shaft in the axial direction with the aid of a fastening means. The fastening means is usually a securing ring.

The above-described prior art has the disadvantage that the assembly of the clutch device on the transmission or on the transmission shaft is difficult.

It is therefore an object of the present invention to create a clutch device having a fastening means for axially fixing the output hub to a transmission shaft, which clutch device permits particularly simple and therefore cost-effective assembly on a transmission.

SUMMARY OF INVENTION

The present invention overcomes the disadvantages in the related art in a clutch device that comprises an engine-side input hub including a driver disk and cutout, a transmission-side output hub adapted to be indirectly coupled to the engine-side input hub, a fastener for axially fixing the transmission-side output hub to a transmission shaft and adapted to be accessed for actuation through the cutout after the engine-side input hub is indirectly coupled to the transmission-side output hub, and a cup-shaped stopper for opening and closing the cutout and, in an installed state, has a guide section that projects in an axial direction out of the cutout and can be supported in an end-side depression of an engine output shaft.

The present invention overcomes the disadvantages in the related art in also a clutch device that comprises an ermine-side input hub including a driver disk and cutout, a transmission-side output hub adapted to be indirectly coupled to the engine-side input hub, a fastener for axially fixing the transmission-side output hub to a transmission shaft and adapted to be accessed for actuation through the cutout after the engine-side input hub is indirectly coupled to the transmission-side output hub, and a closure part for opening and closing the cutout that, in an installed state, has a guide section that projects in an axial direction out of cutout and can be supported in an end-side depression of an engine output shaft, The present invention overcomes the disadvantages in the related art in also as clutch device that comprises: an engine-side input hub including a driver disk; a transmission-side output hub adapted to be indirectly coupled to the engine-side input hub; a fastener for axially fixing the transmission-side output hub to a transmission shaft, adapted to be accessed for actuation after the engine-side input hub is indirectly coupled to the transmission-side output hub, and having a radially projecting encircling collar on which the output hub can be supported in an axial direction, and an exchangeable annular spacer arranged on the encircling collar such that the transmission shaft can be supported in the axial direction on the encircling collar with interposition of the spacer and defining an outer diameter of the annular spacer that is less than an inner diameter of the output hub.

The present invention overcomes the disadvantages in the related art in also a clutch device that comprises: an engine-side input hub including a driver disk; a transmission-side output hub adapted to be indirectly coupled to the engine-side input hub, a fastener for axially fixing the transmission-side output hub to a transmission shaft, adapted to be accessed for actuation after the engine-side input hub is indirectly coupled to the transmission-side output hub, and having a radially projecting encircling collar on which the output hub can be supported in axial direction; and an exchangeable spacer arranged on the encircling collar such that the transmission shaft can be supported in the axial direction on the encircling collar with interposition of the spacer and adapted to be fastened at an end side to the transmission shaft.

The present invention overcomes the disadvantages in the related art in also a clutch device that comprises: an engine-side input hub including a driver disk; a transmission-side output hub adapted to be indirectly coupled to the engine-side input hub; a fastener for axially fixing the transmission-side output hub to a transmission shaft, adapted to be encircling depression on a periphery of the transmission shaft, adapted to be accessed for actuation after the engine-side input hub is indirectly coupled to the transmission-side output hub, and having a radially projecting encircling collar on which the output hub can be supported in an axial direction; and an exchangeable spacer arranged on the encircling collar such that the transmission shaft can be supported in the axial direction on the encircling collar with interposition of the spacer and adapted to be inserted into the depression of the transmission shaft.

In one advantageous embodiment of the clutch device according to the invention, the clutch device is protected from contamination with dirt in that a closure part is provided for opening and closing the cutout on the clutch device. In this way, too, the surroundings of the clutch device are prevented from contamination with dirt, such as for example abrasion particles.

In order that the clutch device can also be used as a wet-running clutch, the cutout may, in a further advantageous embodiment of the clutch device according to the invention, be closed off in a sealing fashion by means of the closure part. An escape of oil and also contamination of said oil with dirt from the outside is reliably prevented in this way.

To obtain particularly secure closure of the cutout, in a further advantageous embodiment of the clutch device according to the invention, the closure part is a cup-shaped stopper. The casing of the cup-shaped stopper may thus for example bear against the wall of the cutout over a relatively long distance in the axial direction in order to obtain a good sealing action. Furthermore, a cup-shaped stopper is lightweight, such that only a small mass must be rotated. The stopper is preferably composed of rubber.

In a further advantageous embodiment of the clutch device according to the invention, the closure part, in the installed state, has a guide section which projects in the axial direction out of the cutout and which can be received, guided and/or supported in an end-side depression of an engine output shaft. While the dimensions of the guide section are fixedly predefined by the input hub in conventional clutch devices, the size, such as for example the diameter and the length, of the guide section can be varied in this embodiment according to the invention by means of suitable selection of the closure part, such that simple retroactive adaptation of the clutch device to the respective engine output shaft, to which the clutch device is to be connected, is possible.

In one particularly preferred embodiment of the clutch device according to the invention, the fastening means can be connected at the end side to the transmission shaft. In this way, particularly good accessibility of the fastening means is ensured even when the clutch device is fully assembled. In the solutions known from the prior art, which propose a securing ring for fastening the output hub, which securing ring is attached to the periphery of the transmission shaft, the fastening means is significantly more difficult to access and actuate even when the clutch device is open.

To be able to fix the output hub to the transmission shaft in a particularly simple and fast manner, in a further particularly preferred embodiment of the clutch device according to the invention, the fastening means has a thread section which can be screwed to a transmission-shaft-side thread section. The assembly is particularly simple if the thread sections extend in each case in the axial direction, since then, the tool which is inserted through the cutout need merely be rotated without thereby requiring a large amount of space.

In a further advantageous embodiment of the clutch device according to the invention, the fastening-means-side thread section has an external thread and the transmission-shaft-side thread section has an internal thread.

To ensure particularly uniform support of the output hub on the fastening means over the entire periphery, in a further preferred embodiment of the clutch device according to the invention, the fastening means has a fitting section which, when connected to a transmission-shaft-side fitting section, forms an interference fit for centering the fastening means. Furthermore, the interference fit serves to strengthen the connection between the fastening means and transmission shaft.

In a further advantageous embodiment of the clutch device according to the invention, the fastening-means-side and transmission-shaft-side fitting sections are of conical design.

In a further preferred embodiment of the clutch device according to the invention, the fastening-means-side and transmission-shaft-side fitting sections are of cylindrical design, with preferably at least one of the cylindrical fitting sections having a conical end section which faces toward the other fitting section. In this way, it is possible for the one fitting section to be inserted into the other fitting section in a simple manner. The conical end section may for example be designed as an encircling chamfer.

In a further advantageous embodiment of the clutch device according to the invention, the fastening-means-side fitting section and/or thread section are/is provided on an axially projecting connecting part of the fastening means, and the transmission-shaft-side fitting section and/or thread section are/is provided in an end-side recess in the transmission shaft.

According to a further advantageous embodiment of the clutch device according to the invention, the axially projecting connecting part of the fastening means can be inserted in the axial direction into the end-side recess in the transmission shaft. As a result of the insertion in the axial direction, the fixing of the output hub to the transmission shaft is particularly simple.

To obtain a secure arrangement of the fastening means and therefore also of the transmission shaft which is connected thereto, of the overall assembly, in a further preferred embodiment of the clutch device according to the invention, the fastening means is supported in the radial direction on the input hub and vice versa. For this purpose, it is for example possible for an encircling radial bearing to be arranged between the fastening means and the input hub.

In a further preferred embodiment of the clutch device according to the invention, the fastening means has an actuating section, which faces toward the cutout, for a tool. An actuating section of said type may for example be designed as a polygon, such that a screwdriver or a wrench socket can be used for rotating the fastening means.

In one particularly preferred embodiment of the clutch device according to the invention, the actuating section has an end-side engagement portion for a tool, into which engagement portion a tool can be inserted in a positively locking fashion. The end-side engagement portion, which is particularly easily accessible in any case, could for example have a polygonal cross section, such that corresponding tools, such as for example an Allen key, can be inserted in a positively locking fashion.

In a further advantageous embodiment of the clutch device according to the invention, the fastening means has a radially projecting encircling collar on which the output hub can be supported in the axial direction. An encircling collar ensures particularly uniform support along the entire periphery.

In a further particularly preferred embodiment of the clutch device according to the invention, an exchangeable spacer is arranged on the encircling collar, such that the transmission shaft can be supported in the axial direction on the encircling collar with the interposition of the spacer. In this way, the axial play of the output hub with respect to the transmission shaft can be adapted to the respective application by means of suitable selection of the spacer.

To obtain uniform support of the shaft on the encircling collar, in a further advantageous embodiment of the clutch device according to the invention, the spacer is of annular design.

To be able to adjust or adapt the axial play of the output hub with respect to the transmission shaft in a particularly simple manner, in a further particularly preferred embodiment of the clutch device according to the invention, a holding space is provided in the clutch device, in which holding space the transmission shaft can be held, with it being possible for the spacer to be passed through the holding space and attached to the fastening means. The spacer must therefore be of correspondingly small design such that it can be inserted through the holding space.

In a further particularly preferred embodiment of the clutch device according to the invention, the outer diameter of the annular spacer is less than the inner diameter of the output hub, such that the annular spacer can be guided through the output hub to the fastening means without problems.

In a further particularly preferred embodiment of the clutch device according to the invention, the spacer can be fastened at the end side to the transmission shaft. It is thus possible, for example, for a corresponding receptacle into which the spacer can be inserted or pushed to be provided on the end side. In this way, the spacer can be guided through the holding space together with the transmission shaft, thereby significantly simplifying assembly.

According to a further preferred embodiment of the clutch device according to the invention, the transmission shaft has an end-side receptacle which is designed as an encircling depression on the periphery of the transmission shaft and into which the spacer can be inserted. In this way, the spacer can be inserted into the receptacle in a particularly simple manner, such that assembly is simplified.

To enhance the above-stated advantage, in a further particularly preferred embodiment of the clutch device according to the invention, the encircling depression is open in the radial outward direction and in the axial direction.

Other objects, features, and advantages of the present invention will be readily appreciated as the same becomes better understood while reading the subsequent description taken in conjunction with the accompanying drawings.

BRIEF DESCRIPTION OF EACH FIGURE OF DRAWING

Figure 2:
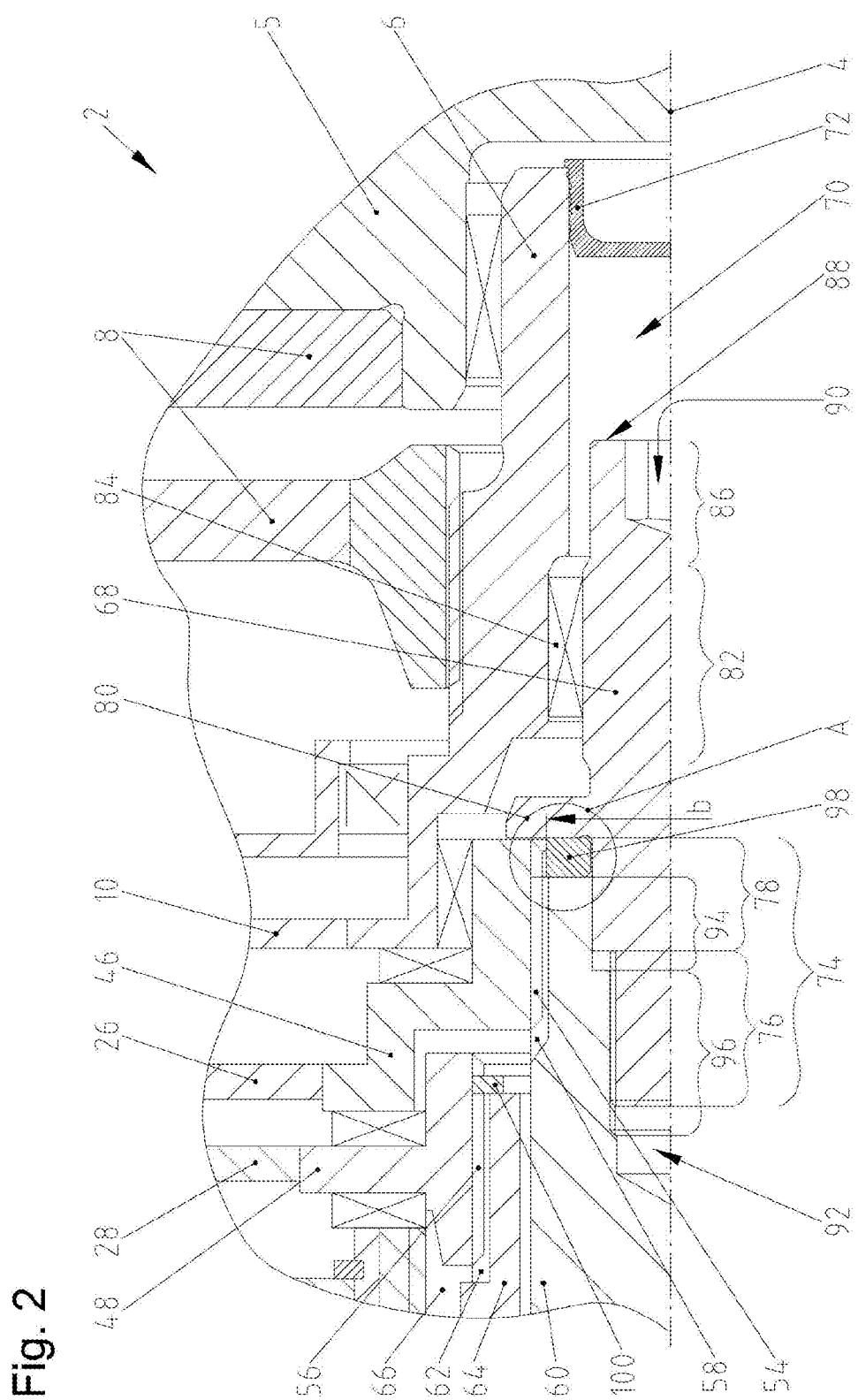
Figure 3:
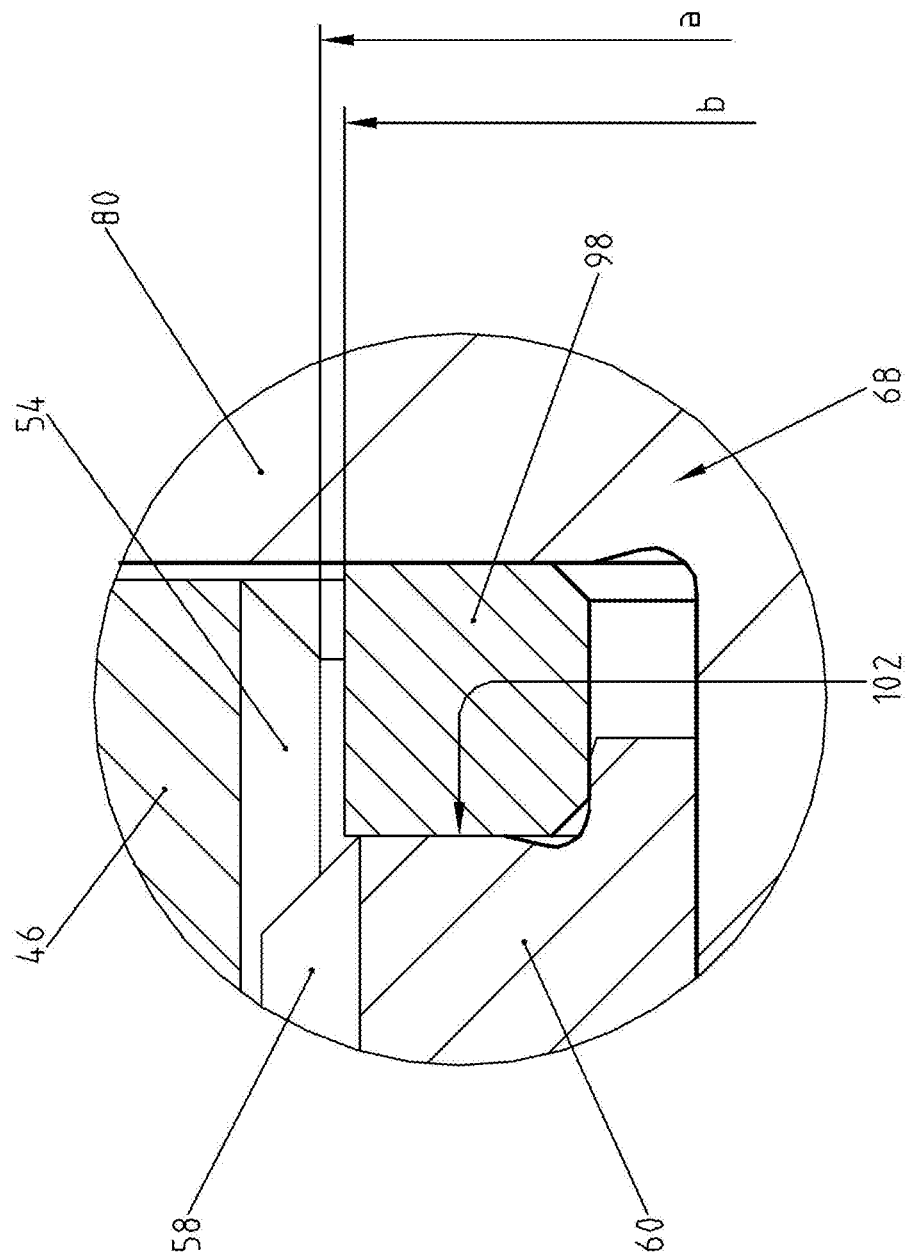
Figure 4:
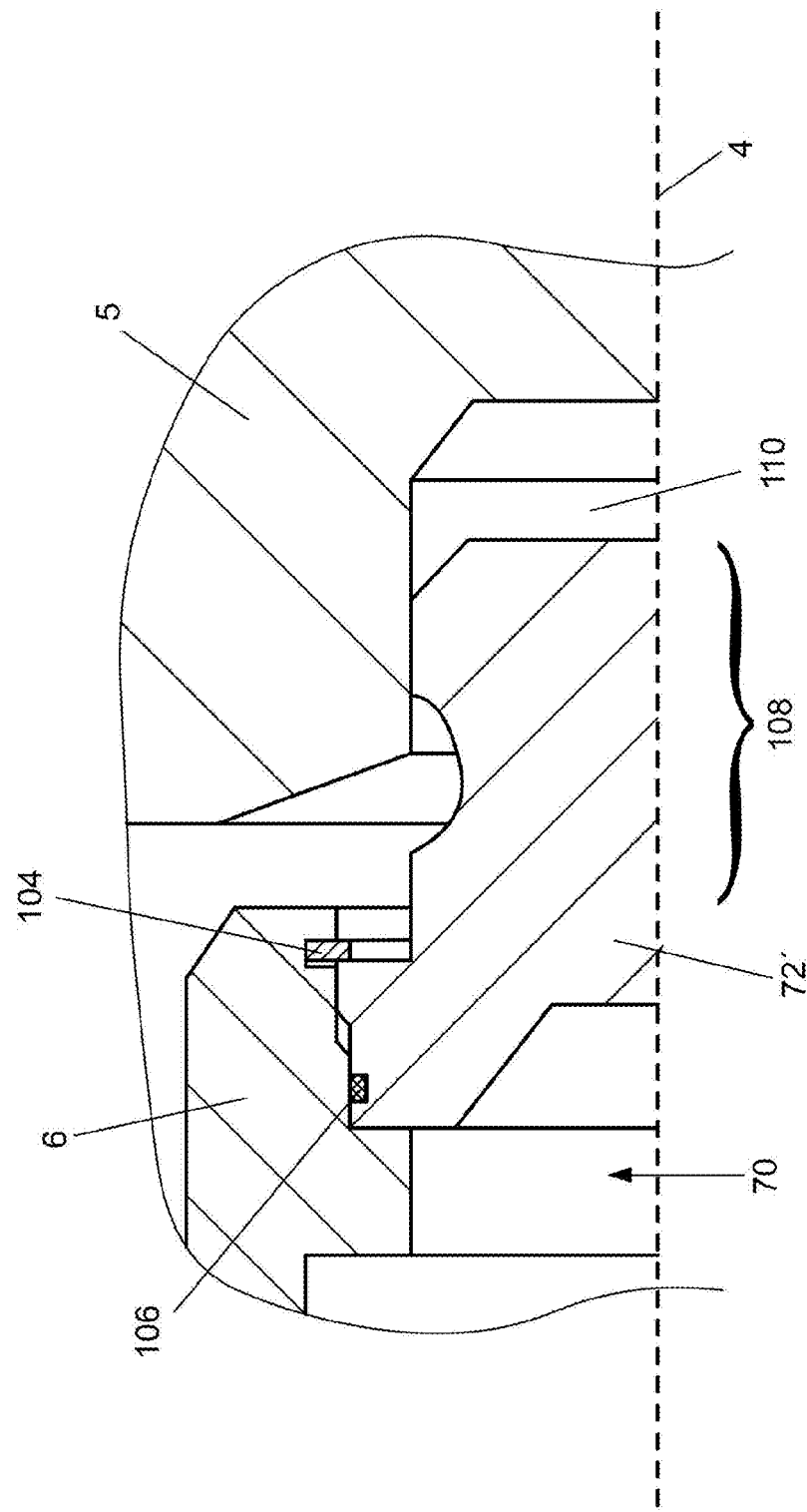

The invention is explained in more detail below on the basis of exemplary embodiments of the invention and with reference to the appended drawing, in which:

FIG. 1 shows a side view of an embodiment of the clutch device according to the invention, in a sectioned illustration, FIG. 2 shows an enlarged illustration of the fastening means from FIG. 1 and of the surrounding region, FIG. 3 shows an enlarged illustration of the detail "A" from FIG. 2 in a modified embodiment of the clutch device, and FIG. 4 shows a partial side view of a closure part for the cutout according to an alternative embodiment, in a sectioned illustration.

DETAILED DESCRIPTION OF INVENTION

FIG. 1 shows an embodiment of the clutch device 2 according to the invention in cross section, with the illustration showing only the upper part in relation to the longitudinal or rotational axis 4 about which the rotatable parts of the clutch device 2 rotate.

The clutch device 2 has an engine-side input hub 6. The input hub 6 is connected by means of a torsional vibration damper 8, of which only a part is indicated in FIG. 1, to an engine output shaft 5, such that a rotation can be transmitted from the engine output shaft 5 to the input hub 6. Here, any rotational shocks are absorbed by the torsional vibration damper 8. The input hub 6 is rotationally fixedly connected, at its end remote from the torsional vibration damper 8, to a driver disk 10.

The driver disk 10 is rotationally fixedly connected to an outer plate carrier 12. Here, the outer plate carrier 12 has an outer support section 14 and an inner support section 16. The support sections 14, 16 are provided in each case with an internal toothing 18, 20. The teeth of a multiplicity of longitudinally movable outer plates 22, 24 engage into the internal toothings 18, 20, which outer plates 22, 24 are therefore rotationally fixedly connected to the outer plate carrier 12.

The clutch device 2, which is embodied as a multiplate clutch, also has an outer and an inner inner plate carrier 26 and 28 respectively. The two inner plate carriers 26, 28 have, at their radially outwardly pointing end, a support section 30, 32 with an external toothing 34, 36. A multiplicity of longitudinally movable inner plates 38, 40 are provided, which inner plates 38, 40 are in engagement with the external toothings 34, 36, such that the inner plates 38, 40 are rotationally fixedly connected to the inner plate carriers 26, 28. The outer and inner plates 22, 24 and 38, 40 are arranged one behind the other in an alternating fashion in the axial direction, and thereby form an outer plate pack 42 and an inner plate pack 44.

The outer inner plate carrier 26 is rotationally fixedly connected, at its radially inwardly pointing end, to a first output hub 46, while the inner inner plate carrier 28 is rotationally fixedly connected, at its radially inwardly pointing end, to a second output hub 48. The clutch device also has a hydraulically actuable, axially movable outer and inner actuating piston 50 and 52 respectively. By means of the outer actuating piston 50, the outer plate pack 42 can be pressed together, such that the input hub 6 can be coupled indirectly to the first output hub 46. By means of the inner actuating piston 52, the inner plate pack 44 can in turn be pressed together, such that the input hub 6 can be coupled indirectly to the second output hub 48.

The output hubs 46, 48 have in each case one central passage which is provided with an internal toothing 54, 56. In the installed state, the internal toothing 54 of the first output hub 46 engages into the external toothing 58 of a first transmission shaft 60, which is designed as a solid shaft, while the internal toothing 56 of the second output hub 48 engages into the external toothing 62 of a second transmission shaft 64, which is designed as a hollow shaft and which surrounds the first transmission shaft 60. In the installed state, the transmission shafts 60, 64 are held in an elongate holding space 66 of the clutch device 2, into which holding space 66 the transmission shafts 60, 64 can be pushed from the side facing away from the input hub 6 along the longitudinal or rotational axis 4. The smallest diameter of the holding space 66 in the longitudinal direction is predefined by the inner diameter "a" of the first output hub 46.

To axially fix the first output hub 46 to the first transmission shaft 60, a fastening means 68 is provided, which is described below with reference to FIG. 2 together with further features of the clutch device 2.

The engine-side input hub 6 is designed such that the fastening means 68 can still be actuated even after the attachment of the engine-side input hub 6 to the rest of the clutch device 2. For this purpose, the input hub 6 has a continuous central cutout 70 which extends along the longitudinal axis 4. A tool can be guided through said cutout 70 in order to actuate the fastening means 68.

The clutch device 2 also has a closure part 72 for closing off and opening the cutout 70, with the closure part 72 closing off that side of the cutout 70 which faces away from the clutch device 2 and which faces toward the engine side. In the present embodiment, the closure part 72 is formed in the manner of a cup-shaped stopper which is composed substantially of rubber and which closes off the cutout 70 in a sealing fashion.

The fastening means 68 has an axially projecting connecting part 74 which extends to the first transmission shaft 60. Here, the projecting connecting part 74 comprises a fastening-means-side thread section 76 and an adjoining fastening-means-side fitting section 78 with a larger diameter. The fitting section 78 is adjoined by a section in which a radially projecting encircling collar 80 is provided. The collar 80 is adjoined in the axial direction by a support section 82. The support section 82 of the fastening means 68 is supported in the radial direction on the inner side of the input hub 6 via a radial bearing 84. In the same way, the input hub 6 is supported on the fastening means 68 via the radial bearing 84. The fastening means 68 accordingly extends into the input hub 6, which is designed in the manner of a pot, with the closure part 72 forming the base of the pot.

Further in the axial direction, the support section 82 is adjoined by an actuating section 86 for a tool, with the actuating section 86 facing toward the cutout 70 or being arranged in the latter. An engagement portion 90, which is designed as a hexagonal engagement portion, is provided in that end side 88 of the fastening section 86 which faces toward the cutout 70. A tool, such as for example an Allen key, can be inserted into the engagement portion 90 in a positively locking fashion through the cutout 70 in order to subsequently rotate the fastening means about the longitudinal axis 4.

The fastening means 68 may be connected at the end side to the first transmission shaft 60. For this purpose, a recess 92 is provided in that end side of the first transmission shaft 60 which faces toward the fastening means 68. Proceeding from the end side, the recess 92 has a transmission-shaft-side fitting section 94 and an adjoining transmission-shaft-side thread section 96.

Further features of the invention are described below with reference to FIGS. 1 and 2 within the context of the description of the procedure for mounting the clutch device 2 on a transmission.

Firstly, the fully assembled clutch device 2 is provided. Here, the fully assembled clutch device 2 comprises all the components shown in FIG. 1, with the exception of the torsional vibration damper 8, the transmission shafts 60, 64 and the engine output shaft 5, such that the holding space 66 is empty, the closure part 72 can be removed and the fastening means 68 is accessible via the cutout 70. To define the axial play of the first output hub 46 which is to be fastened to the first transmission shaft 60, an exchangeable annular spacer 98 is firstly attached to the fastening means 68. Here, the annular spacer 98 is firstly guided through the holding space 66 to the fastening means 68, since the clutch device 2 has already been fully assembled. The outer diameter "b" of the annular spacer 98 is selected here so as to be smaller than the inner diameter "a" of the first output hub 46, such that the annular spacer 98 can actually be guided up to the fastening means 68. Having arrived at the fastening means 68, the annular spacer 98 is pushed over the fastening-means-side fitting section 78 and supported in the axial direction on the collar 80.

The clutch device 2 is subsequently placed onto the transmission, as a result of which the transmission shafts 60, 64 are guided along the longitudinal axis 4 into the holding space 66. In this way, the axially projecting connecting part 74 of the fastening means 68 is inserted in the axial direction into the end-side recess 92 in the first transmission shaft 60.

To now securely fix the first output hub 46 to the first transmission shaft 60 in the axial direction, the closure part 72 is firstly removed. An Allen key is, subsequently inserted through the cutout 70 into the engagement portion 90 in order to screw the fastening means 68 into the recess 92 in the first transmission shaft 60. Here, the external thread of the fastening-means-side thread section 76 is screwed to the internal thread of the transmission-shaft-side thread section 96. As a result of the screwing action, the cylindrical fitting section 78 of the fastening means 68 is forced into the cylindrical fitting section 94 of the first transmission shaft 60 and forms an interference fit with said cylindrical fitting section 94, which interference fit serves inter alia to center the fastening means 68 with respect to the first transmission shaft 60. To permit simple insertion of the one fitting section 78 into the other fitting section 94, it is possible for at least one of the cylindrical fitting sections 78, 94 to have a conical end section (not illustrated) which faces toward the other fitting section 94, 78. The fastening means 68 is now screwed further into the recess 92 until the first transmission shaft 60 is supported with its end side on the encircling collar 80 with the interposition of the annular spacer 98.

The first output hub 46 is now fixed to the first transmission shaft 60 with play in the axial direction, with the movement of the first output hub 46 in the direction of the input hub 6 being restricted by the encircling collar 80, against which the first output hub 46 can be supported in the axial direction. The thicker the annular spacer 98 is designed to be in the axial direction, the greater the axial play of the first output hub 46. In the other axial direction, the movement of the first output hub 46 is restricted indirectly by means of a securing ring 100 on the internal toothing 56 of the second output hub 48. The securing ring 100 is arranged in an axially immovable manner on the second output hub 48 and serves as a stop for the end side of the second transmission shaft 64.

After the connection of the fastening means 68 to the first transmission shaft 60, the cutout 72 can be closed off again by means of the closure part 72, before the torsional vibration damper is thereafter rotationally fixedly connected to the input hub 6.

In a modified embodiment (not illustrated) of the clutch device 2, the fastening-means-side and the transmission-shaft-side fitting sections 78, 94 are of conical design. The fitting sections 78, 94 therefore serve not only to center and strengthen the connection. In fact, the fitting sections 78, 94 also serve as stops between the first transmission shaft 60 at one side and the fastening means 68 at the other side. It would then be necessary to select the annular stop 98 such that the first output hub 46 is supported on the encircling collar 80 with the interposition of the annular space 98. The first embodiment is however preferable since, in the alternative embodiment, the attachment of the annular spacer 98 through the holding space 66 is more difficult.

In a further modified embodiment (FIG. 3) of the clutch device 2, a receptacle 102 is provided on the end side of the first transmission shaft 60 for fastening the spacer 98 to the first transmission shaft 60. Here, the receptacle 102 is designed as an end-side encircling depression into which the spacer 98 can be inserted. Here, the receptacle 102 is provided on the periphery of the transmission shaft 60, in such a way that the receptacle 102 is open in the radial outward direction and in the axial direction. In this way, the spacer 98 can firstly be captively inserted into the receptacle 102 on the transmission shaft 60 in a particularly simple manner and subsequently guided together with the transmission shaft 60 through the holding space 66 to the fastening means 68, thereby significantly simplifying assembly.

FIG. 4 shows an alternative embodiment of the closure part 72'. The closure part 72' is fixed in the cutout 70 of the input hub 6 in the direction of the longitudinal axis 4 by means of a securing ring 104, with a seal 106 being provided in order to be able to close off the cutout 70 in a sealing fashion. In the installed state of the closure part 72', the latter has a guide section 108 which projects out of the cutout 70 in the axial direction. After the clutch device is mounted on the engine output shaft 5, said guide section 108 is held in an end-side depression 110 of the engine output shaft 5, as shown in FIG. 4. The guide section 108 is also guided in the axial direction, and supported in the radial direction, within the depression 110 on the engine output shaft 5. A closure part 72' of said type has the advantage that the length and the diameter of the guide section 108 can be changed quickly and in a simple manner by means of an exchange with a different closure part whose guide section has different dimensions. Particularly simple adaptation of the clutch device 2 to respective engine output shafts 5, to which the clutch device 2 is to be connected, is therefore possible.

While, in the above-described embodiments, the fastening means 68 is brought to the transmission shafts 60, 64 as a module together with the clutch device 2, it may be advantageous for the fastening means 68 to be added only after the attachment of the clutch device 2 to the transmission shafts 60, 64. In such a case, the cutout 70 should be dimensioned such that the fastening means 68—if appropriate together with the spacer 98—can be guided through the cutout 70 and attached to the transmission shaft 60 retroactively. In the above exemplary embodiments, it would then be necessary for the encircling collar 80 to have, for example, a diameter which is smaller than the smallest diameter of the cutout 70. Said dimensioning of the cutout 70 is also advantageous for example if a simple securing ring were to be used instead of the fastening means 68.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

The invention claimed is:

1. A clutch device comprising:
an engine-side input hub (6) including a driver disk (10) and a cutout (70);
a transmission-side output hub (46) adapted to be indirectly coupled to the engine-side input hub (6);
a fastener (68) for axially fixing the transmission-side output hub (46) to a transmission shaft (60) and adapted to be accessed for actuation through the cutout (70) after the engine-side input hub is indirectly coupled to the transmission-side output hub; and
a cup-shaped stopper (72) for opening and closing the cutout (70) and, in an installed state, has a guide section (180) that projects in an axial direction out of the cutout (70) and can be supported in an end-side depression (110) of an engine output shaft(5).

2. The clutch device as set forth in claim 1, wherein the cutout (70) can be closed off in a sealing fashion by the cup-shaped stopper (72).

3. The clutch device as set forth in claim 1, wherein the fastener (68) can be connected at an end side to the transmission shaft (60).

4. The clutch device as set forth in claim 3, wherein the fastener (68) has a fastener-side thread section (76) which can be screwed to a transmission-shaft-side thread section (96).

5. The clutch device as set forth in claim 4, wherein the fastener-side thread section (76) has an external thread and the transmission-shaft-side thread section (96) has an internal thread.

6. The clutch device as set forth in claim 4, wherein the fastener (68) has a fastener-side fitting section (78) which, when connected to a transmission-shaft-side fitting section (94), forms an interference fit for centering the fastening means (68).

7. The clutch device as set forth in claim 6, wherein the fastener-side and transmission-shaft-side fitting sections are conical.

8. The clutch device as set forth in claim 6, wherein the fastener-side and transmission-shaft-side fitting sections (78, 94) are cylindrical.

9. The clutch device as set forth in claim 8, wherein at least one of the fitting sections (78, 94) has a conical end section which faces toward the other of the fitting sections (94, 78).

10. The clutch device as set forth in claim 6, wherein at least one of the fastening-means-side fitting section (78) and thread section (76) is provided on an axially projecting connecting part (74) of the fastening means (68) and at least one of the transmission-shaft-side fitting section (94) and thread section (96) is provided in an end-side recess (92) in the transmission shaft (60).

11. The clutch device as set forth in claim 10, wherein the axially projecting connecting part (74) of the fastening (68) can be inserted in an axial direction into the end-side recess (92) in the transmission shaft (60).

12. The clutch device as set forth in claim 1, wherein the fastener (68) is supported in a radial direction on the input hub (6) and the input hub (6) is supported in the radial direction on the fastening means (68).

13. The clutch device as set forth in claim 1, wherein the fastener (68) has an actuating section (86), which faces toward the cutout (70), for a tool.

14. The clutch device as set forth in claim 13, wherein the actuating section (86) has an end-side engagement portion (90), into which the tool can be inserted in a positively locking fashion.

15. The clutch device as set forth in claim 1, wherein the clutch device (2) includes a holding space (66) in which the transmission shaft (60) can be held and through which a spacer (98) can be passed and the spacer (98) can be attached to the fastener (68).

16. The clutch device as set forth in claim 1, wherein the cutout (70) is a central cutout (70).

17. A clutch device comprising:
an engine-side input hub (6) including a driver disk (10) and a cutout (70);
a transmission-side output hub (46) adapted to be indirectly coupled to the engine-side input hub (6);
a fastener (68) for axially fixing the transmission-side output hub (46) to a transmission shaft (60) and adapted to be accessed for actuation through the cutout (70) after the engine-side input hub is indirectly coupled to the transmission-side output hub; and
a closure part (72) for opening and closing the cutout(70) that, in an installed state, had a guide section (108) that projects in an axial direction out of the cutout (70) and can be supported in an end-side depression (110) of an engine output shaft (5).

18. A clutch device comprising:
an engine-side input hub (6) including a driver disk (10);
a transmission-side output hub (46) adapted to be indirectly coupled to the engine-side input hub (6);
a fastener (68) for axially fixing the transmission-side output hub (46) to transmission shaft (60), adapted to be accessed for actuation after the engine-side input hub (6) is indirectly coupled to the transmission-side output hub (46), and having a radially projecting encircling collar (80) on which the output hub (46) can be supported in an axial direction; and
an exchangeable annular spacer (98) arranged on the encircling collar (80) such that the transmission shaft (60) can be supported in the axial direction on the encircling collar (80) with interposition of the spacer (98) and defining an outer diameter (b) of the annular spacer (98) that is less than an inner diameter (a) of the output hub (46).

19. A clutch device comprising:
an engine-side input hub (6) including a driver disk (10);

a transmission-side output hub (46) adapted to be indirectly coupled to the engine-side input hub (6);

a fastener (68) for axially fixing the transmission-side output hub (46) to a transmission shaft (60), adapted to be accessed for actuation after the engine-side input hub (6) is indirectly coupled to the transmission-side output hub (46), and having a radially projecting encircling collar (80) on which the output hub (46) can be supported in an axial direction; and an exchangeable spacer (98) arranged on the encircling collar (80) such that the transmission shaft (60) can be supported in the axial direction on the encircling collar (80) with interposition of the spacer (98) and adapted to be fastened at an end side to the transmission shaft (60).

20. A clutch device comprising:

an engine-side input hub (6) including a driver disk(10);

a transmission-side output hub (46) adapted to be indirectly coupled to the engine-side input hub(6);

a fastener (68) for axially fixing the transmission-side output hub (46) to a transmission shaft (60) having an end-side receptacle (102) that is an encircling depression on a periphery of the transmission shaft (60), the fastener (68) is adapted to be accessed for actuation after the engine-side input hub (6) is indirectly coupled to the transmission-side output hub (46), and having a radially projecting encircling collar (80) on which the output hub (46) can be supported in an axial direction; and an exchangeable spacer (98) arranged on the encircling collar (80) such that the transmission shaft (60) can be supported in the axial direction on the encircling collar (80) with interposition of the spacer (98) and adapted to be inserted into the depression of the transmission shaft (60).

21. The clutch device as set forth in claim 20, wherein the encircling depression is open in a radial outward direction and the axial direction.

\* \* \* \* \*

UNITED STATES PATENT AND TRADEMARK OFFICE
CERTIFICATE OF CORRECTION

PATENT NO. : 8,479,906 B2  
APPLICATION NO. : 12/524083  
DATED : July 9, 2013  
INVENTOR(S) : Hans Juergen Hauck It is certified that error appears in the above-identified patent and that said Letters Patent is hereby corrected as shown below:

In the Claims:

Column 9, line 41 delete "(180)" and insert therefor --(108)--.

Column 9, line 60 - 61 delete "fastening means" and insert therefor --fastener--.

Column 10, line 5 delete "fastening-means-side" and insert therefor --fastener-side--.

Column 10, line 7 delete "fastening means" and insert therefor --fastener--.

Column 10, line 12 delete "fastening" and insert therefor --fastener--.

Column 10, line 18 delete "fastening means" and insert therefor --fastener--.

Column 10, line 44 delete "had" and insert therefor --has--.

Column 10, line 53 insert --a-- between "to" and "transmission".

Signed and Sealed this  
Twenty-eighth Day of January, 2014

Michelle K. Lee  
*Deputy Director of the United States Patent and Trademark Office*